United States Patent
Hikimochi et al.

(10) Patent No.: US 11,700,634 B2
(45) Date of Patent: Jul. 11, 2023

(54) PACKET SWITCH AND METHOD OF SETTING TIME SLOT

(71) Applicant: FUJITSU LIMITED, Kawasaki (JP)

(72) Inventors: Norikazu Hikimochi, Kanazawa (JP); Kazuto Nishimura, Yokohama (JP); Yoshikazu Sabetto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 17/246,729

(22) Filed: May 3, 2021

(65) Prior Publication Data

US 2022/0022200 A1    Jan. 20, 2022

(30) Foreign Application Priority Data

Jul. 17, 2020   (JP) ................................. 2020-123039

(51) Int. Cl.
*H04W 72/56*   (2023.01)
*H04W 72/0446*   (2023.01)
*H04W 72/52*   (2023.01)

(52) U.S. Cl.
CPC ....... *H04W 72/56* (2023.01); *H04W 72/0446* (2013.01); *H04W 72/52* (2023.01)

(58) Field of Classification Search
CPC ............. H04W 72/10; H04W 72/0446; H04W 72/0486; H04L 47/24
See application file for complete search history.

(56) References Cited

U.S. PATENT DOCUMENTS

| | | | |
|---|---|---|---|
| 10,063,457 B2* | 8/2018 | Haas .................... | H04L 45/02 |
| 2007/0274295 A1* | 11/2007 | Nishimura ............. | H04L 45/32 |
| | | | 370/352 |
| 2019/0158411 A1* | 5/2019 | Nishimura ............ | H04L 43/022 |
| 2019/0215832 A1* | 7/2019 | Nishimura ............ | H04L 47/625 |
| 2019/0306075 A1* | 10/2019 | Nishimura .......... | H04L 43/0894 |
| 2019/0356612 A1* | 11/2019 | Hikimochi .......... | H04L 49/9084 |
| 2020/0314033 A1* | 10/2020 | Hirota .................. | H04L 49/552 |
| 2022/0217572 A1* | 7/2022 | Shibata ............. | H04W 28/0278 |

FOREIGN PATENT DOCUMENTS

JP      2019-176276 A      10/2019

OTHER PUBLICATIONS

Nishimura et al., "Prototype of low-latency layer 2 switch for mobile front haul", The Institute of Electronics, Information and Communication Engineers Technical Report, vol. 118, No. 7, CS2018-8, pp. 41-46, Apr. 2018, with an English translation.

* cited by examiner

*Primary Examiner* — Tejis Daya
(74) *Attorney, Agent, or Firm* — Myers Wolin, LLC

(57) ABSTRACT

A packet switch includes a memory, and a processor coupled to the memory and configured to learn a pattern of a high-priority packet having a cyclicity, monitor a burst end point of the high-priority packet, based on a result of the learning, detect a shift of a time slot of the burst end point when a traffic flow rate of the high-priority packet changes, and determine the time slot to close transmission of a non-priority packet, based on the shift of the time slot.

8 Claims, 16 Drawing Sheets

FIG. 9

| TS | GATE CONTROL | PROCESS DETERMINATION | GATE CONTROL AFTER CORRECTION |
|---|---|---|---|
| 0 | Open | TS OF BURST START POINT-1 IS POSITIVE VALUE→NO<br>TS OF BURST START POINT IS 0→NO | Open |
| 1 | Open | TS OF BURST START POINT-1 IS POSITIVE VALUE→NO<br>TS OF BURST START POINT IS 0→NO | Open |
| 2 | Open | TS OF BURST START POINT-1 IS POSITIVE VALUE<br>→Yes (FORWARD SHIFT DETECTION)<br>THRESHOLD VALUE DETERMINATION ($c > c\_th$)→<br>Yes(THRESHOLD VALUE EXCEEDING)<br>DETERMINE THAT FORWARD SHIFT OCCURS<br>BURST START POINT OF CLOSE TS IS CHANGED TO 2 | Close |
| 3 | Close | TS OF BURST START POINT-1 IS POSITIVE VALUE→NO<br>TS OF BURST START POINT IS 0→NO | Close |
| 4 | Close | TS OF BURST START POINT-1 IS POSITIVE VALUE→NO<br>TS OF BURST START POINT IS 0→NO | Close |
| 5 | Close | TS OF BURST START POINT-1 IS POSITIVE VALUE→NO<br>TS OF BURST START POINT IS 0→NO | Close |
| 6 | Open | TS OF BURST START POINT-1 IS POSITIVE VALUE→NO<br>TS OF BURST START POINT IS 0→NO | Open |
| 7 | Open | TS OF BURST START POINT-1 IS POSITIVE VALUE→NO<br>TS OF BURST START POINT IS 0→NO | Open |
| 8 | Open | TS OF BURST START POINT-1 IS POSITIVE VALUE→NO<br>TS OF BURST START POINT IS 0→NO | Open |
| ... | | | |

INITIAL STATE

FORWARD SHIFT PATTERN (FLOW RATE DECREASE) FROM INITIAL STATE

BACKWARD SHIFT PATTERN (FLOW RATE INCREASE) FROM INITIAL STATE

FIG. 13

| TS | GATE CONTROL | PROCESS DETERMINATION | GATE CONTROL AFTER CORRECTION |
|---|---|---|---|
| 0 | Open | BURST START POINT-1 OR BURST START POINT→NO<br>BURST END POINT OR BURST END POINT+1→NO | Open |
| 1 | Open | BURST START POINT-1 OR BURST START POINT→NO<br>BURST END POINT OR BURST END POINT+1→NO | Open |
| 2 | Open | BURST START POINT-1 OR BURST START POINT→YES<br>THEREAFTER NO CORRECTION WITH EXISTING FLOW | Open |
| 3 | Close | BURST START POINT-1 OR BURST START POINT→YES<br>THEREAFTER NO CORRECTION WITH EXISTING FLOW | Close |
| 4 | Close | BURST START POINT-1 OR BURST START POINT→NO<br>BURST END POINT OR BURST END POINT+1→NO | Close |
| 5 | Close | BURST START POINT-1 OR BURST START POINT→NO<br>BURST END POINT OR BURST END POINT+1→YES | Close |
| 6 | Open | BURST START POINT-1 OR BURST START POINT→NO<br>BURST END POINT OR BURST END POINT+1→YES<br>THRESHOLD VALUE DETERMINATION (f > f_th)→YES(THRESHOLD VALUE EXCEEDING,)<br>DETERMINE THAT BACKWARD SHIFT OCCURS<br>BURST START POINT OF CLOSE TS IS CHANGED TO 6 | Close |
| 7 | Open | BURST START POINT-1 OR BURST START POINT→NO<br>BURST END POINT OR BURST END POINT+1→YES | Open |
| 8 | Open | BURST START POINT-1 OR BURST START POINT→NO<br>BURST END POINT OR BURST END POINT+1→NO | Open |
| ... | Open | BURST START POINT-1 OR BURST START POINT→NO<br>BURST END POINT OR BURST END POINT+1→NO | Open |

PACKET SWITCH AND METHOD OF SETTING TIME SLOT

CROSS-REFERENCE TO RELATED APPLICATION

This application is based upon and claims the benefit of priority of the prior Japanese Patent Application No. 2020-123039, filed on Jul. 17, 2020, the entire contents of which are incorporated herein by reference.

FIELD

The embodiments discussed herein are related to a packet switch and a method of setting a time slot.

BACKGROUND

In the next-generation mobile communication system (5G), not only the terminals of the related art such as smartphones, but also a wide variety of apparatuses such as automobiles, industrial machines, and smart meters are connected. In order to support applications such as automatic driving of automobiles, VR (Virtual Reality)/AR (Augmented Reality), and telemedicine, 5G needs a super-delay characteristic of 1 msec in a wireless section. Further, in 5G, the base station function has been reconsidered to separate Base Band Unit (BBU) and Remote Radio Head (RRH)) and reduce the amount of transmission in order to reduce the size of the cells. Furthermore, in order to improve the network efficiency, it is conceivable to shift to a packet network that integrates a wired network and a wireless network that includes Mobile Front Haul (MFH) and Mobile Back Haul (MBH).

In such an integrated network, traffic with various characteristics and requirements flows on the same network. In particular, MFH has a characteristic that is more sensitive to delay than other traffic due to restrictions such as 5G requirements and retransmission control regulations. For example, since an output delay occurs due to a conflict between an MFH packet from an MFH line and an MBH packet from an MBH line, a priority control process for suppressing the output delay has been known. In the priority control process, a subsequent high-priority packet is preferentially read overtaking a queued low-priority packet, so that the output delay of a high-priority MFH packet may be suppressed.

In this priority control process, when the high-priority packet arrives while the low-priority packet is being read, the reading operation of the high-priority packet is stopped until the reading output of the low-priority packet being read is completed, which causes a stand-by period for one packet. In the MFH line, for example, an output delay of 100 μsec or less is needed between the RRH and the BBU. In the case of a multi-stage node configuration, this output delay for one packet may not be ignored.

Here, the Institute of Electrical and Electronics Engineers (IEEE) 802.1 Time Sensitive Networking (TSN), which may implement a low delay in a packet network, is attracting attention. The IEEE 802.1 TSN discloses a technique for collecting the requirements of mobile front haul network, a gate control of which traffic of other TSN standards is captured, and a queuing-related technique for reducing the packet switch delay, to implement a low delay in MFH.

Further, as a method for outputting high-priority packets with priority, there is a Time Aware Sharp (TAS) of IEEE 802.1 Qbv. As prior art related to TAS, for example, there has been proposed a packet processing apparatus that suppresses the output delay of high-priority packets by determining a forward shift and a backward shift of observation cycle based on the number of arrival packets within a predetermined period (see, e.g., Japanese Laid-Open Patent Publication No. 2019-176276). In addition, there has been disclosed an autonomous TAS (Intelligent TAS (iTAS)) technique for achieving a low delay by adjusting the timing of gate control through an autonomous learning of the cycle of MFH traffic by a switch node based on the TAS technique (see, e.g., Non-Patent Document 1 below).

Related technologies are disclosed in, for example, Japanese Laid-Open Patent Publication No. 2019-176276.

Related technologies are also disclosed in, Kazuto Nishimura, others 2, "Prototype of low-delay layer 2 switch in mobile front hall," Shingaku Giho, IEICE (The Institute of Electronics Information and Communication Engineering), April 2018, P. 41-46 (Non-Patent Document 1).

SUMMARY

According to an aspect of the embodiments, a packet switch includes a memory, and a processor coupled to the memory and configured to learn a pattern of a high-priority packet having a cyclicity, monitor a burst end point of the high-priority packet, based on a result of the learning, detect a shift of a time slot of the burst end point when a traffic flow rate of the high-priority packet changes, and determine the time slot to close transmission of a non-priority packet, based on the shift of the time slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a chart illustrating a gate opened/closed state due to shift correction of the burst start point in the steady monitoring phase of the packet switch;

FIG. 13 is a chart illustrating a gate opened/closed state due to shift correction of the burst end point in the steady monitoring phase of the packet switch;

DESCRIPTION OF EMBODIMENTS

Figure 1:
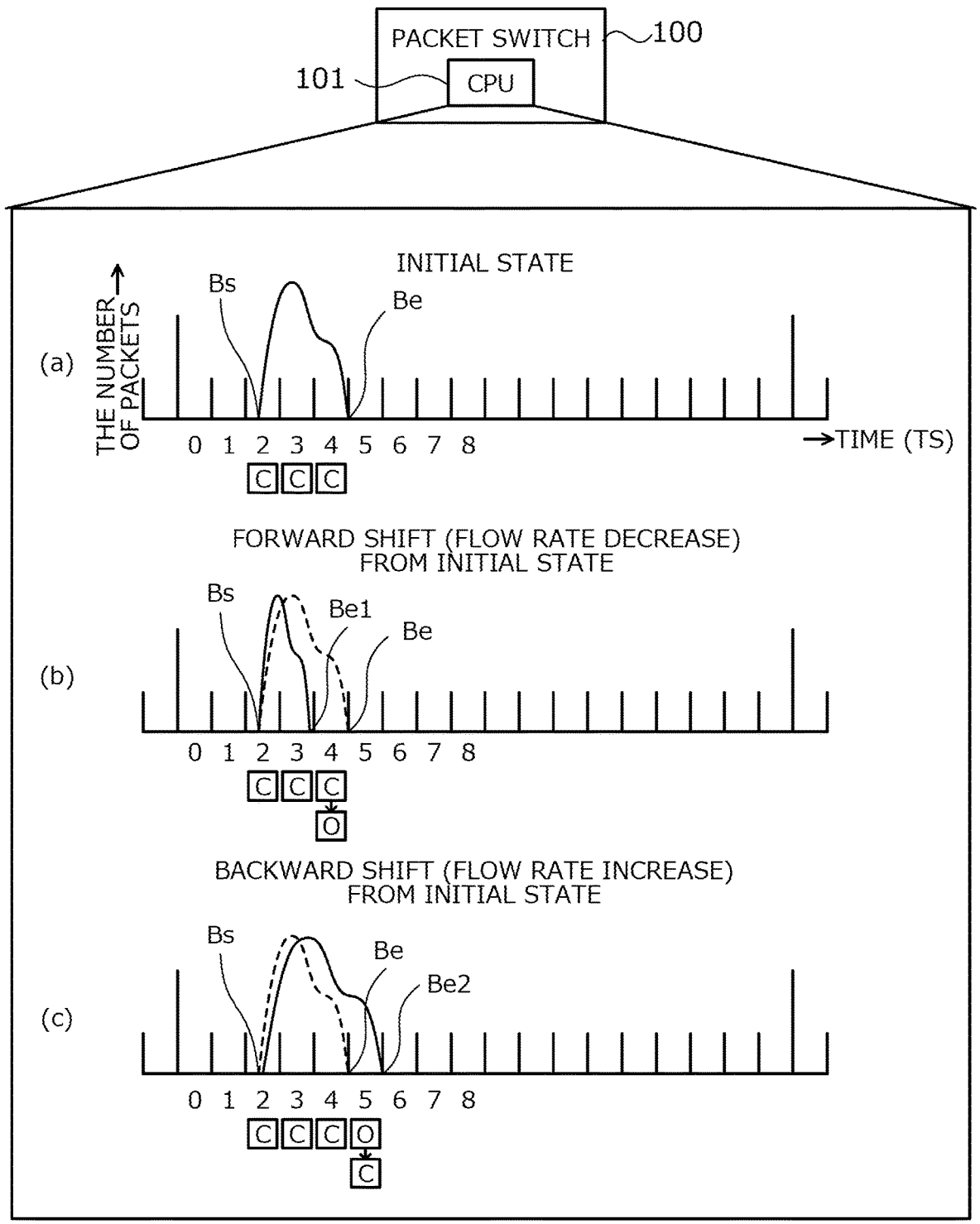
FIG. 1 is an explanatory diagram illustrating an example of a packet switch according to embodiments.

In the related art, when the end point of the burst packet changes due to an increase or decrease in the flow rate of the high-priority packet, the gate control timing may not be appropriately controlled. In the iTAS, the gate control timing with the following phases (1) to (3) is controlled.

(1) "Cycle determination phase" in which the packet flow rate in the device is learned and the cycle determination is performed. (2) "Close TS determination phase" in which the time slot (TS) to be closed is determined from a traffic pattern in the cycle and a gate control list (GCL) is generated. (3) "Steady monitoring phase" in which a gate control is performed according to the GCL.

The phases (1) and (2) are learning states based on an arrived packet, and the phase (3) controls the gate based on the GCL created in the phase (2) in the actual operating state of the device. In the iTAS, all high-priority packets are set to open with respect to the GCL setting state, and the gate control for non-priority packets is corrected to be set from open to close according to a traffic pattern of high-priority packets.

Here, the steady monitoring phase (3) is set to monitor a "shift" due to clock deviation and correct the burst position of high-priority packets. Therefore, when there is a "shift" that exceeds a certain threshold value, such as a sudden increase in the packet flow rate, the correction may not be made within the steady monitoring phase (3) and there rises a need to reconstruct the close TS by the close TS determination phase (2).

The close TS determination phase (2) needs a cycle determination by the cycle determination phase (1) and needs to execute a learning processes of the cycle determination phase again (1) and the close TS determination phase (2) once the device is in the non-operating state. Therefore, during a period until the close TS is determined by the close TS determination phase (2), the device may not perform the gate control in the operating state, and the start of low-delay control is delayed. In this way, in the related art, when the end point of the burst packet changes due to the increase or decrease in the flow rate of the high-priority packet, the gate control may not be performed within the steady monitoring phase (3), that is, while the device is in the operating state, which causes a delay in low-delay control.

Hereinafter, embodiments of a technique capable of appropriately performing the gate control of a non-priority packet to close even when the end point of a burst changes due to an increase or decrease in the flow rate of a high-priority packet will be described in detail with reference to the drawings.

EMBODIMENTS

[Outline of Method of Setting Time Slot]

FIG. 1 is an explanatory diagram illustrating an example of a packet switch according to an embodiment. The packet switch 100 of the embodiment statistically learns an arrival pattern of high-priority packets and determines a time slot (TS) for closing the passage of non-priority packets. Then, the packet switch 100 monitors a change (increase or decrease) in the flow rate of the high-priority packet and determines a TS for closing according to the change in the flow rate. A control unit (CPU) 101 of the packet switch 100 controls the close TS.

In the following description, the high-priority packet is an MFH packet, and the non-priority packet is a non-MFH packet. In (a) to (c) of FIG. 1, the horizontal axis represents time, and the vertical axis represents the number of MFH packets arrived at the packet switch 100.

The packet switch 100 performs a gate opening/closing operation according to the steady monitoring phase during operation. At this time, the shift of the learned packet arrival timing is monitored by the clock deviation or the like, and the TS to close is determined.

(a) of FIG. 1 is a diagram illustrating an initial state of a certain MFH. The initial state corresponds to the arrival state of MFH packets at a fixed cycle at the start of the steady monitoring phase. The MFH is a burst signal having a predetermined number of packets for each TS according to the flow rate and has a burst start point Bs and a burst end point Be. It is assumed that the burst start point Bs is located at TS2 and the burst end point Be is located at TS4. In this case, the packet switch 100 controls the close (indicated by C in the figure) of TS2 to TS4 corresponding to the burst period of MFH so that non-priority packets do not pass through.

Thereafter, when the flow rate of the MFH decreases or increases, with the TS position of the burst start point Bs unchanged, the TS position of the burst end point Be shifts back and forth. For example, when the flow rate of the MFH decreases, as illustrated in (b) of FIG. 1, the burst end point Be shifts forward (in time) with respect to the initial state. The shifted burst end point Be1 is located at TS3 one before the burst end point Be in the initial state of (a) of FIG. 1.

Further, when the flow rate of MFH increases, as illustrated in (c) of FIG. 1, the burst end point Be shifts backward with respect to the initial state. It is assumed that the shifted burst end point Be1 is located at TS5 one after the burst end point Be in the initial state of (a) of FIG. 1.

In the packet switch 100 of the embodiment, in the steady monitoring phase, the burst end point Be of the MFH is monitored and the TS corresponding to the burst end point Be is close or open according to the decrease or increase of the packet flow rate of the MFH.

For example, as illustrated in (b) of FIG. 1, when the burst end point Be1 is located at TS3 with a forward shift, the packet switch 100 changes TS4 that has been closed until then, to open (indicated by O in the figure). Further, as illustrated in (c) of FIG. 1, when the burst end point Be1 is located at TS5 with a forward shift, the packet switch 100 changes TS5 that has been opened until then, to close.

The close and open of each TS are performed for non-MFH packets. For example, in the example of (b) of FIG. 1, TS4 that has closed the non-MFH packet passage in (a) of FIG. 1 before the change in flow rate is changed to open. In the example of (c) of FIG. 1, TS5 that has opened the non-MFH packet passage in (a) of FIG. 1 before the change in flow rate is changed to close.

Further, in (b) and (c) of FIG. 1, for the convenience of description, the forward shift and the backward shift are set for one TS, but when the forward shift and the backward shift are detected by a plurality of TSs, control to change the shifted plurality of TSs to open or close is performed.

In this way, the packet switch 100 of the embodiment monitors the forward shift and backward shift of the burst end point Be based on a large change in traffic pattern of packets during the processing of the steady monitoring phase, for example, a decrease or increase in the flow rate of the MFH packet. Then, the packet switch 100 determines a TS to close according to this shift. Although the details will be described later, the packet switch 100 corrects the close TS included in the gate control list (GCL) created at the time of learning. As a result, even when the flow rate of the MFH packet changes, the operation of the packet switch 100 may be continued in the form of correcting the GCL during the processing of the steady monitoring phase.

In particular, in the embodiment, when a "shift" exceeding a predetermined threshold value occurs due to a sudden increase in packet flow rate or the like, the TS position of the burst end point Be is corrected within the steady monitoring phase. As a result, the packet switch 100 may eliminate a need for process return to re-learning (the close TS determination phase) for determining the TS to close from the traffic pattern in a cycle outside the process of the steady monitoring phase. Since the gate control may be performed in the operating state, the control in the low-delay state may be continued and the output delay of the high-priority packet may be suppressed, securing the low-delayability.

[Overview of Packet Switch]

Figure 2:
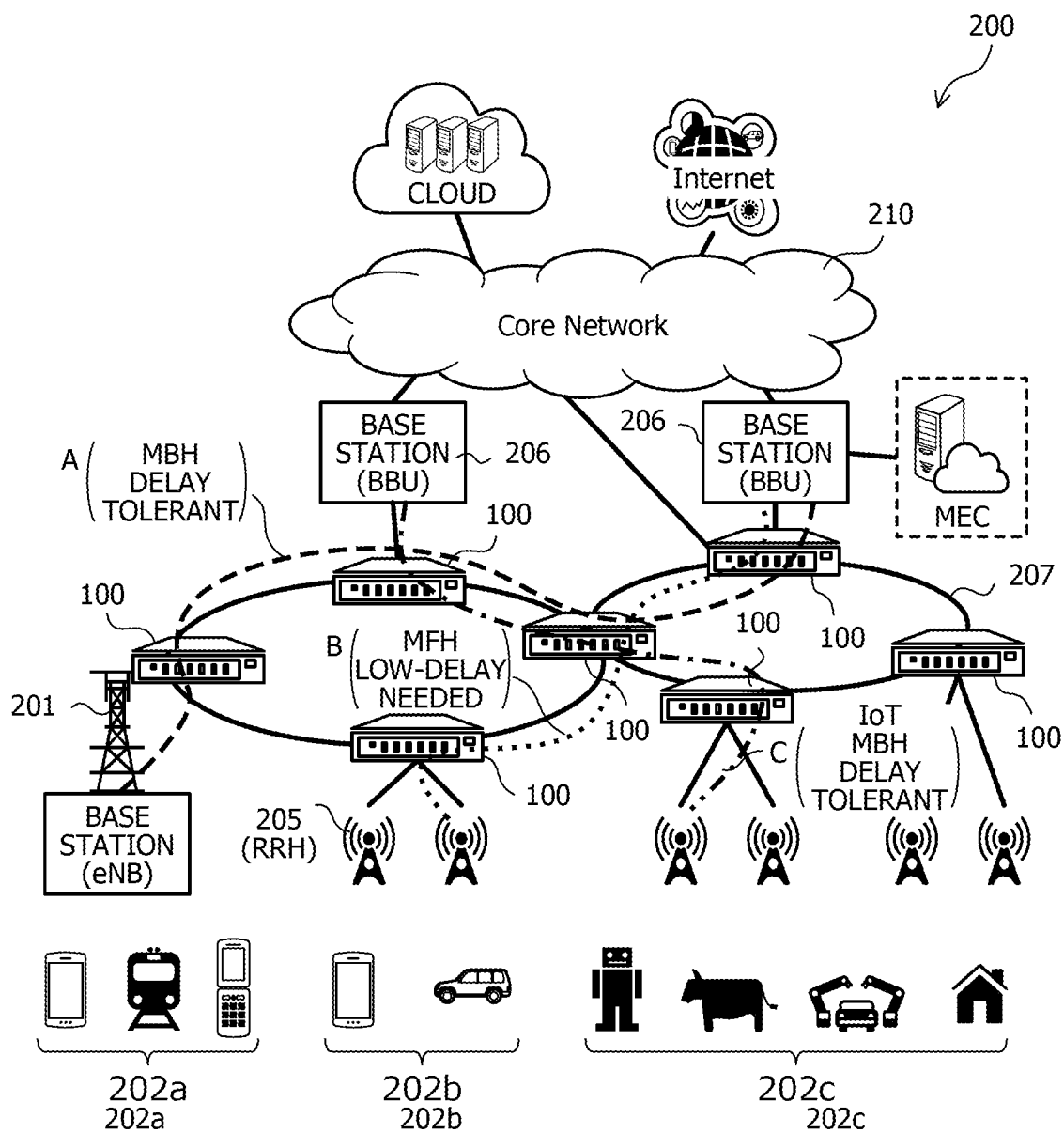
FIG. 2 is a diagram illustrating a configuration example of a communication system including the packet switch.

FIG. 2 is a diagram illustrating an example of a configuration of a communication system including the packet switch. The communication system 200 illustrated in FIG. 2 has an MBH line A in which a delay is tolerated and an MFH line B in which a low delay is needed. The MBH line A is a line that connects between a plurality of base stations (eNBs: evolved Nodes B) 201. In addition, IoT terminals 202c and the like are connected to a BBU 206 via a delay-tolerant line C.

Each base station 201 makes a wireless connection with wireless terminals 202a through a wireless antenna. The MFH line B is a line connecting between Remote Radio Head (RRH) 205 and Base Band Unit (BBU) 206. The RRH 205 makes a wireless connection with the wireless terminals 202b. The MFH line B adopts a CPRI scheme that transmits a wireless signal between the RRH 205 and the BBU 206, as an L2 frame MFH packet. The MFH packet is needed to suppress the output delay as compared with the MBH packet.

The BBU 206 has a radio section scheduling function. The scheduling function is a function of determining various elements such as user data, a coding rate, and a modulation scheme, to be transmitted to one sub frame. For example, the BBU 206 divides the user data transmitted from the core network 210 side, into L2 frames and transmits the MFH packet to the RRH 205. That is, the BBU 206 transmits the MFH packet to the RRH 205 every sub frame interval, for example, every 1 ms. Further, the RRH 205 divides the user data of the received radio signal into L2 frames and transmits the MFH packet to the BBU 206.

A plurality of packet switches 100 described above are arranged on a backbone line 207 connecting among the eNBs 201, the RRH 205, and the BBU 206. Each packet switch 100 is a line that transmits a MBH packet from the MBH line A and a MFH packet from the MFH line B. Further, the packet switch 100 transmits various packets in addition to the MBH packet and the MFH packet. The packet switch 100 applies a Time Aware Shaper (TAS) scheme and outputs the MFH packet as a high-priority packet.

Figure 3:
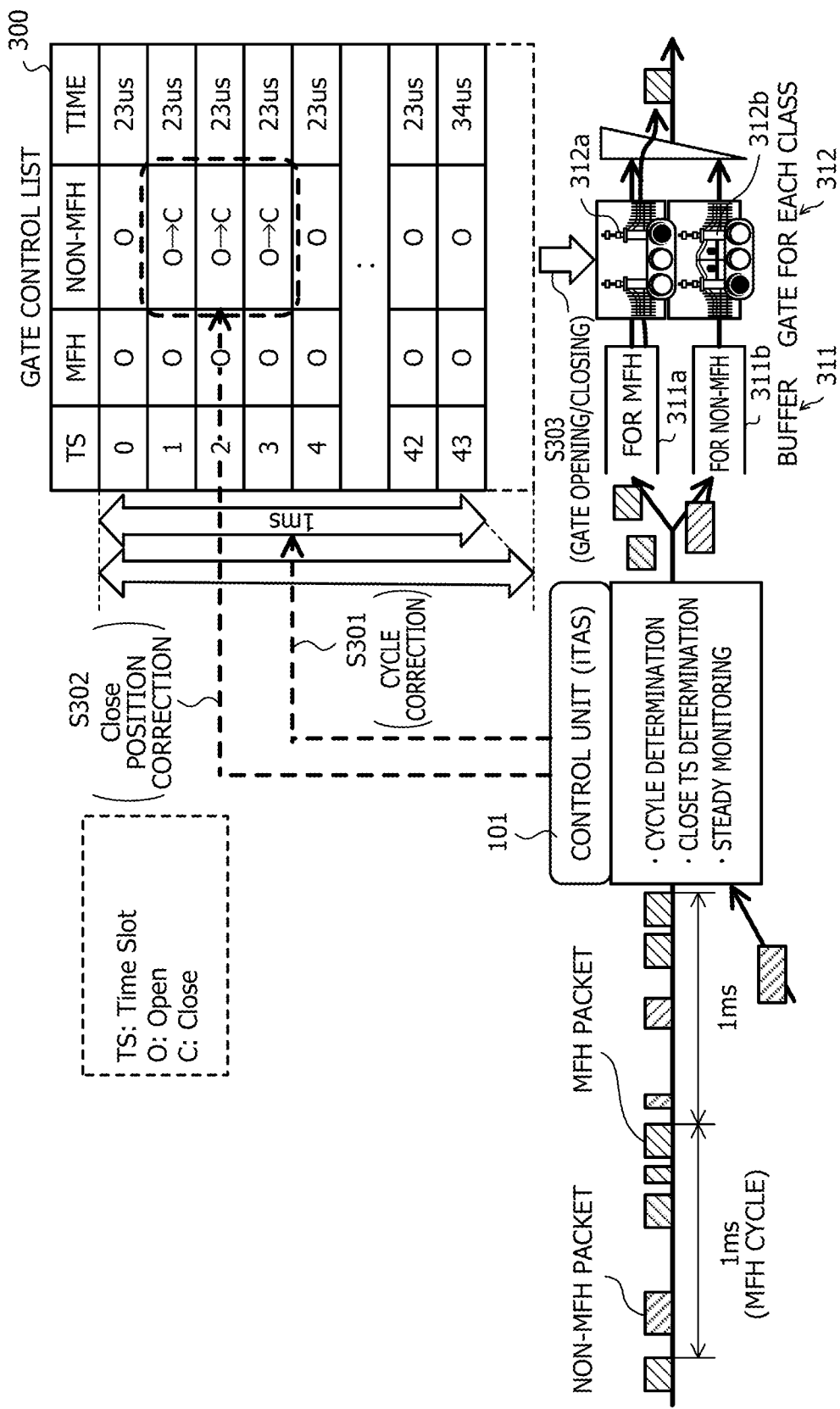
FIG. 3 is a diagram for explaining gate control of the packet switch.

FIG. 3 is a diagram illustrating the gate control of the packet switch. The packet switch 100 performs the gate control based on the setting of the created GCL 300. MFH packets and non-MFH packets arrive at the packet switch 100 in an MFH cycle (e.g., 1 ms).

The control unit (CPU) 101 of the packet switch 100 controls the timing of the gate control with the above-described phases (1) to (3), that is, the "cycle determination phase" (1) in which the packet flow rate in the device is learned and the cycle determination is performed, the "close TS determination phase" (2) in which the time slot (TS) to be closed is determined from a traffic pattern in the cycle and a gate control list (GCL) is generated, and the "steady monitoring phase" (3) in which gate control is performed according to the GCL, as the packet control of iTAS.

In the "cycle determination phase" (1), the control unit 101 collects the arrival amount of traffic of the MFH packet that needs a low-delay for each TS time and detects the MFH cycle. As detection methods, a burst edge method in which the beginning of the cycle is estimated by the rising position from 0 to positive, a folding analysis method using auto-correlation of traffic, and the like are used. When the cycle is detected, the cycle length of the gate control list (GCL) 300 is corrected to match the detection cycle (operation S301), and as needed, the number of TSs is increased or decreased, and the time of 1 TS is corrected.

The GCL 300 includes the settings of open (O) or close (C) for MFH packets and non-MFH packets for each TS, and MFH and non-MFH are all open (O) in the initial state. Here, for example, when it is determined that the MFH cycle is 1 ms and the MFH has arrived at TS=the phases (1), (2), and (3), the control unit 101 sets the non-MFH of TS=the phases (1), (2), and (3) of the GCL 300, to close (C), as illustrated in the figure.

In the "close TS determination phase" (2), when the packet arrival cycle and the cycle substantially match each other due to the correction in the "cycle determination phase" (1), the MFH burst packet arrives at substantially the same TS every time. In this phase, the control unit 101 grasps the burst shape by observing the beginning TS of the burst and its length for a plurality of cycles, and sets a TS and its front and back margins for the non-MFH of the GCL 300, to close (C) so as to cover the burst.

In the "steady monitoring phase" (3), when the "close TS decision phase" (2) is completed, the TAS gate control functions and the MFH traffic begins to flow with a low-delay. However, the detection cycle may shift from the actual transmission cycle. Here, the control unit 101 continues the observation, and when the burst arrival TS (burst start point) begins to shift back and forth in the time axis direction of the TS, the control unit 101 detects this shift and corrects the close TS to follow (operation S302).

The control unit 101 controls the opening/closing of the gate based on the setting of the GCL 300 in the "steady monitoring phase" (3). The control unit 101 stores the MFH and non-MFH packets in a buffer 311. The control unit 101 stores the MFH packets in a buffer 311a and the non-MFH packets in a buffer 311b. Then, the control unit 101 controls the gate opening/closing of these MFH and non-MFH packets and outputs them (operation S303).

The control unit 101 performs the gate control with a gate 312 for each class. The control unit 101 controls the gate opening/closing of the MFH packets read from the buffer 311a with a gate 312a. Further, the control unit 101 controls the gate opening/closing of the non-MFH packets read from the buffer 311b with a gate 312b. For example, the control unit 101 always keeps the gate 312a open for the MFH packets input to the buffer 311a and performs the gate control to immediately output the MFH packets. Meanwhile, the control unit 101 sequentially stores the non-MFH packets input to the buffer 311b in the buffer 311b, and performs the gate control to output the non-MFH packets with the gate 312b open at the timing of open (O) set in the GCL 300.

Figure 4:
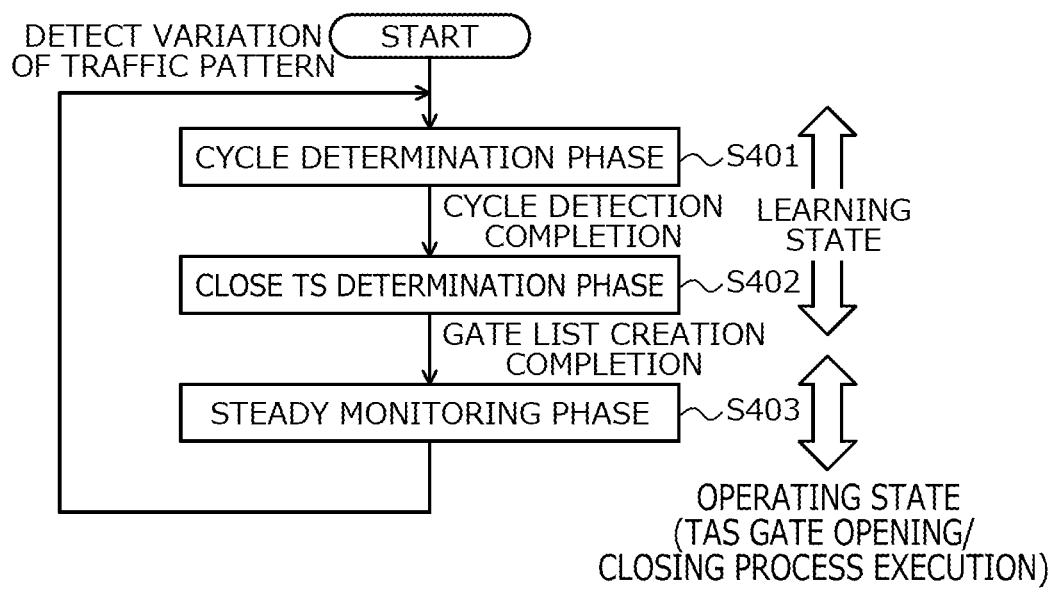
FIG. 4 is a diagram illustrating phases of the gate control of the packet switch.

FIG. 4 is a diagram illustrating phases of the gate control of the packet switch. The control unit 101 of the packet switch 100 is in a learning state for creating the GCL 300 during non-operation and executes the process of the "cycle determination phase" (1) (operation S401) and the process of the "close TS determination phase" (2) (operation S402).

The cycle detection of the MFH packets is completed by the process of the "cycle determination phase" (1), and the creation of the GCL 300 is completed by the process of the "close TS determination phase" (2). Then, the control unit 101 puts the packet switch 100 into the operating state, executes the process of the "steady monitoring phase" (3) (operation S403), and performs a gate opening/closing process by TAS.

The control unit 101 of the packet switch 100 having the above configuration may detect the cyclicity of the high-priority side correctly by classifying the traffic into MFH of high-priority packets and other non-priority packets (non-MFH) in the "steady monitoring phase" (3). In the case of Low Layer Split (LLS), since a wireless scheduler is on the BBU 206 side, there is a high possibility that the MFH generates meaningful digital data (=packet burst) cyclically for each sub frame or symbol.

In addition, in the initial setting of the GCL 300, the control unit 101 sets both MFH and non-MFH to open (O), and also sets one cycle length appropriately. Then, after traffic communication, the control unit 101 may close the gate at the correct timing since the switch autonomously learns in the "cycle determination phase" (1) and the "close TS determination phase" (2) to correct the cycle length and the close position.

Then, each node (the packet switch 100) on the network autonomously performs the above processes of the "cycle determination phase" (1) and the "close TS determination phase" (2), resulting in timing optimization for the entire network even when the packet switches 100 do not cooperate with each other.

Then, in the "steady monitoring phase" (3), by following the cycle shift and continuing to correct the close TS, the opening/closing timing of the gate (non-MFH gate 312b) is always maintained appropriately in the operating state in which the traffic is communicated. As a result, the low-delayability of the MFH packets in the packet switch 100 may be maintained.

Here, in the existing technique, when a large change (rapid increase or decrease in packet flow rate) occurs in the traffic pattern of the packets arriving at the packet switch 100, a shift occurs in the burst end point. In this case, there is a need to once release the process of the "steady monitoring phase" (3) (operation S403). Then, with the packet switch 100 put in the non-operation, the learning state of the "cycle determination phase" (1) (operation S401) and the "close TS determination phase" (2) (operation S402) need to be re-executed. As a result, the existing technique may not follow a large change in the traffic pattern of the packets, and may not maintain the low-delayability, so that the performance may not be improved.

Figure 5:
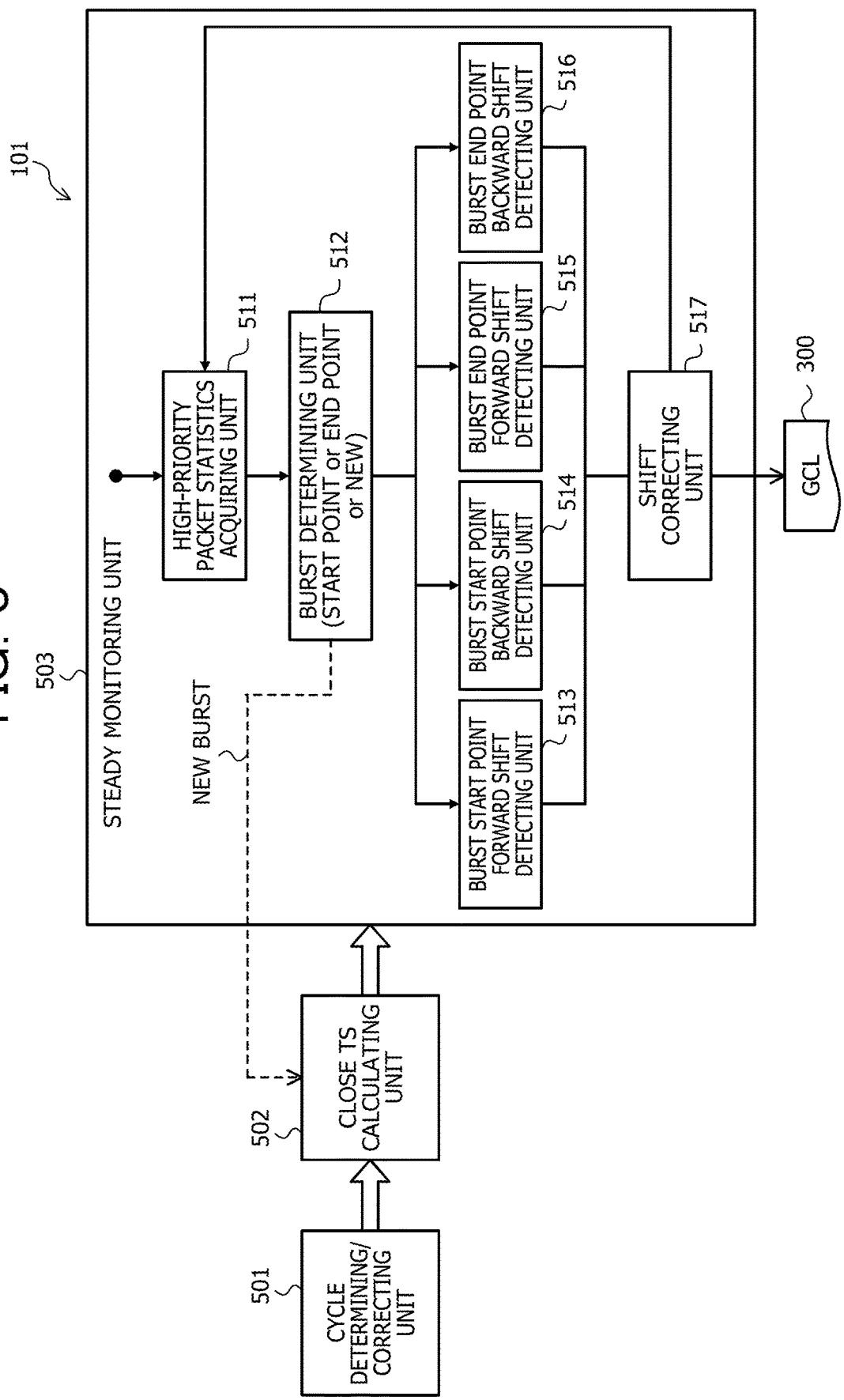
FIG. 5 is a functional block diagram of the packet switch.

FIG. 5 is a functional block diagram of the packet switch, which illustrates the functions of the control unit 101 of the packet switch 100. The control unit 101 includes a cycle determining/correcting unit 501, a close TS calculating unit 502, and a steady monitoring unit 503.

The cycle determining/correcting unit 501 executes the process related to the "cycle determination phase" (1). The cycle determining/correcting unit 501 collects the amount of MFH arrival at the packet switch 100 at regular time intervals, and detects the cyclicity of the MFH. The cycle determining/correcting unit 501 performs the cycle detection a plurality of times and determines the cycle length of the GCL 300 based on a calculated average cycle.

The close TS calculating unit 502 executes the process related to the "close TS determination phase" (2). The close TS calculating unit 502 grasps the burst shape by observing the head TS of the MFH burst and its length for a plurality of cycles, and outputs the GCL 300 in which the corresponding TS of non-MFH is changed to close (C).

The steady monitoring unit 503 executes the process related to the "steady monitoring phase" (3) in the operating state of the packet switch 100. The steady monitoring unit 503 includes a high-priority packet statistics acquiring unit 511, a burst determining unit 512, a burst start point forward shift detecting unit 513, a burst start point backward shift detecting unit 514, a burst end point forward shift detecting unit 515, a burst end point backward shift detecting unit 516, and a shift correcting unit 517.

The high-priority packet statistics acquiring unit 511 acquires statistical information regarding the high-priority MFH packets that have arrived at the packet switch 100. The statistical information corresponds to the information of GCL 300 processed and created by each of the cycle determining/correcting unit 501 and the close TS calculating unit 502. For example, the statistical information includes the MFH cycle, the number of packets, the setting of open (O) or close (C) of the gate for MFH packets and non-MFH packets for each TS, and the like.

The burst determining unit 512 performs a burst determination of the MFH packets based on the statistical information acquired by the high-priority packet statistics acquiring unit 511. The burst start point and the burst end point of each of arriving MFH packets are determined in this burst determination. The arrival of new MFH packets within the cycle is also determined in this burst determination. For the MFH packets determined to be new based on the statistical information, information of correction of the close TS is output to the close TS calculating unit 502.

The burst start point forward shift detecting unit 513 detects the forward shift of the burst start point Bs of the arriving MFH packets. That is, it is detected whether or not the burst start point Bs of the newly arriving MFH is located in the front TS with respect to the burst start point Bs set in the GCL 300. The burst start point backward shift detecting unit 514 detects the backward shift of the burst start point Bs of the arriving MFH packets. That is, it is detected whether or not the burst start point Bs of the newly arriving MFH is located in the rear TS with respect to the burst start point Bs set in the GCL 300.

The burst end point forward shift detecting unit 515 detects the forward shift of the burst end point Be of the arriving MFH packets. As illustrated in (b) of FIG. 1, a state in which the burst end point Be1 of the newly arriving MFH is located in the front TS with respect to the burst end point Be set in the GCL 300 is detected. The burst end point backward shift detecting unit 516 detects the backward shift of the burst end point Be of the arriving MFH packets. As illustrated in (c) of FIG. 1, a state in which the burst end point Bet of the newly arriving MFH is located in the rear TS with respect to the burst end point Be set in the GCL 300 is detected.

The shift correcting unit 517 performs a correction corresponding to the amount of shift detected by any of the burst start point forward shift detecting unit 513 to the burst end point backward shift detecting unit 516. For example, the shift correcting unit 517 corrects the position of the open or close TS set in the GCL 300. When there is no need to change the length of one cycle of the GCL 300, this one cycle is corrected.

Figure 6:
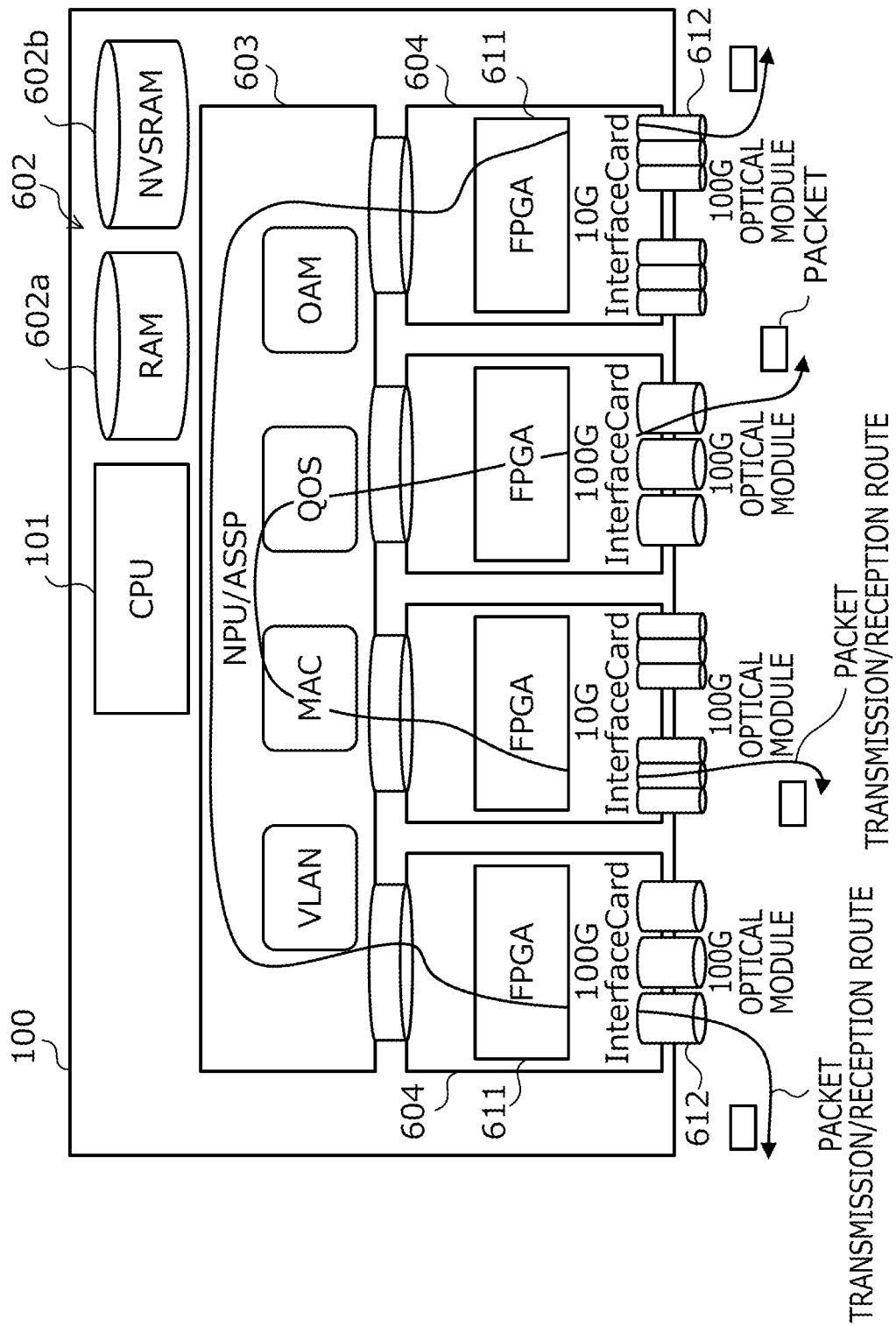
FIG. 6 is a diagram illustrating a hardware configuration example of the packet switch.

FIG. 6 is a diagram illustrating an example of a hardware configuration of the packet switch. In FIG. 6, a CPU (Central Processing Unit) 101, a memory 602, a network processor (NPU/ASSP) 603, a plurality of interface cards 604, and the like are provided in the case (shelf) of the packet switch 100. NPU is an abbreviation for Network Processing Unit, and ASSP is an abbreviation for Application Specific Standard Produce.

The CPU 101 supervises the overall control of the packet switch 100, and controls and monitors various devices of the network processor 603 and the interface cards 604. The CPU 101 executes the control of iTAS according to an embodiment.

The memory 602 includes, for example, a volatile memory (RAM: Random Access Memory) 602a and a non-volatile memory (NVSRAM: Non-Volatile Static Random Access Memory) 602b. A control program of iTAS is stored in the volatile memory 602a, and the CPU 101 reads and executes the program. The non-volatile memory 602b is a database or the like that is accessed when the control of iTAS is executed by the CPU 101, and stores setting information and the like of the packet switch 100.

The network processor 603 and each interface card 604 have a blade configuration and may be freely attached to and detached from the shelf. The number of interface cards 604 may be increased or decreased according to the number of lines to be accommodated, and an interface card 604 corresponding to a line speed can be mounted.

The network processor 603 executes a process related to the L2 function (VLAN, MAC, QOS, or OAM) of the packet switch 100 under the control of the CPU 101, and in the embodiment, performs control of the opening/closing of the gate according to an instruction of the CPU 101. The VLAN is an abbreviation for Virtual Local Area Network, and MAC is an abbreviation for Medium Access Control. The QOS is an abbreviation for Quality of Service, and OAM is an abbreviation for Operation and Maintenance Cell.

The interface card 604 includes a FPGA (Field-Programmable Gate Array) 611 and an optical module 612. The FPGA 611 drives and controls the optical module 612. The optical module 612 converts an optical signal on a network into an electrical signal and vice versa. The network processor 603 relays packets among a plurality of interface cards 604 corresponding to packet transmission/reception routes.

[Correction of Burst Start Point Shift in Steady Monitoring Phase]

Figure 7A:
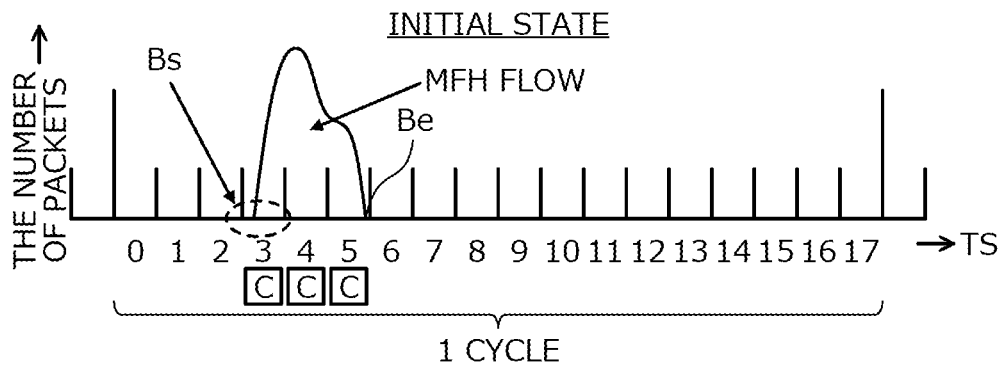
FIGS. 7A, 7B and 7C are each an explanatory diagram of an example of correction process of a burst start point shift in a steady monitoring phase of the packet switch.

FIGS. 7A to 1C are each an explanatory diagram of an example of correction process of the burst start point shift in the steady monitoring phase of the packet switch. In an initial state illustrated in FIG. 7A, the control unit (CPU) 101 monitors the burst start point Bs of MFH. It is assumed that the burst start point Bs is located at TS3. In this case, the packet switch 100 performs a control of close (indicated by C in the figure) in which TS3 to TS5 corresponding to the burst period of MFH do not pass through non-priority packets.

Figure 7B:
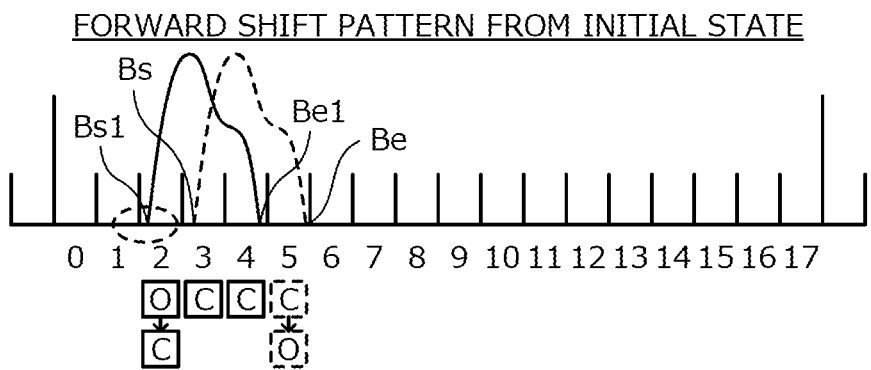
Figure 7C:
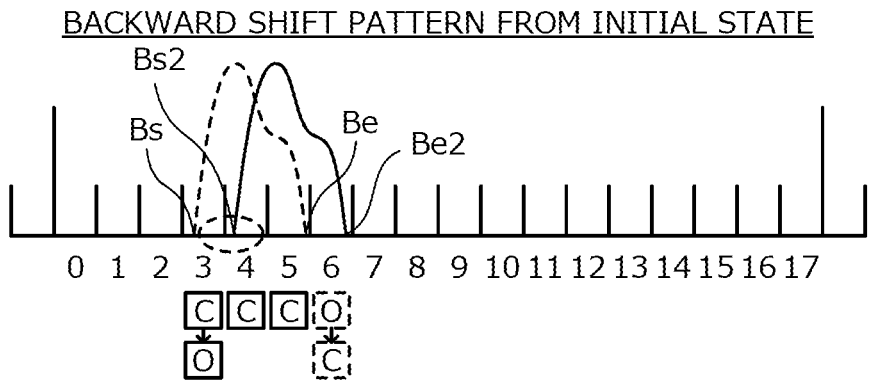

FIGS. 7B and 7C illustrate a case where the burst start point Bs shifts due to the clock deviation under the condition that the MFH burst flow rate is constant. In this case, the burst end point Be shifts in the form of shifting the entire burst in the way of shifting the burst start point Bs.

For example, as illustrated in FIG. 7B, it is assumed that the burst start point Bs shifts forward, and the shifted burst start point Bs1 is located at TS2. In this case, the control unit 101 changes the TS2 that has been open (indicated by O in the figure), to close (indicated by C in the figure).

Further, as illustrated in FIG. 7C, it is assumed that the burst start point Bs shifts backward, and the shifted burst start point Bs2 is located at TS4. In this case, the control unit 101 changes the TS3 that has been close, to open.

The close and open of each TS are performed for non-MFH packets. For example, in the example of FIG. 7B, the TS2 in which the non-MFH packets are passed (open) in FIG. 7A in the initial state is changed to close.

In the example of FIG. 7C, the TS3 in which the non-MFH packet passage has been close in FIG. 7A in the initial state is changed to open.

In the embodiment, the correction of the shift of the burst end point Be is performed by a shift correction process for the burst end point Be, which will be described later. Therefore, in the correction of the shift of the burst start point Bs, there is no need for correction of shift for the burst end point Be.

When the burst start point Bs shifts due to the clock deviation under the condition that the burst flow rate of the MFH is constant, the burst end point Be shifts in the form of shifting the entire burst in the way of shifting the burst start point Bs. For example, in the forward shift of FIG. 7B, the burst end point Be also shifts forward, and the shifted burst end point Be1 is located at TS4. In this case, the control unit 101 may control TS5 that has been closed until then, to change to open. Further, in the backward shift illustrated in FIG. 7C, the burst end point Be also shifts backward, and the shifted burst end point Bet is located at TS6. In this case, the control unit 101 may control the TS6 that has been opened until then, to change to close.

A case in which the shift correction of the burst end point Be is performed at the time of such shift correction of the burst start point Bs may be considered. In this case, the shift of the burst end point Be due to the clock deviation may be dealt with only when it is assumed that the MFH burst flow rate is constant. However, when a large change (rapid increase or decrease in packet flow rate) occurs in the traffic pattern of the packets arriving at the packet switch 100, the amount of shift of the burst end point Be may not be obtained and dealt with only from the burst start point Bs.

Figure 8:
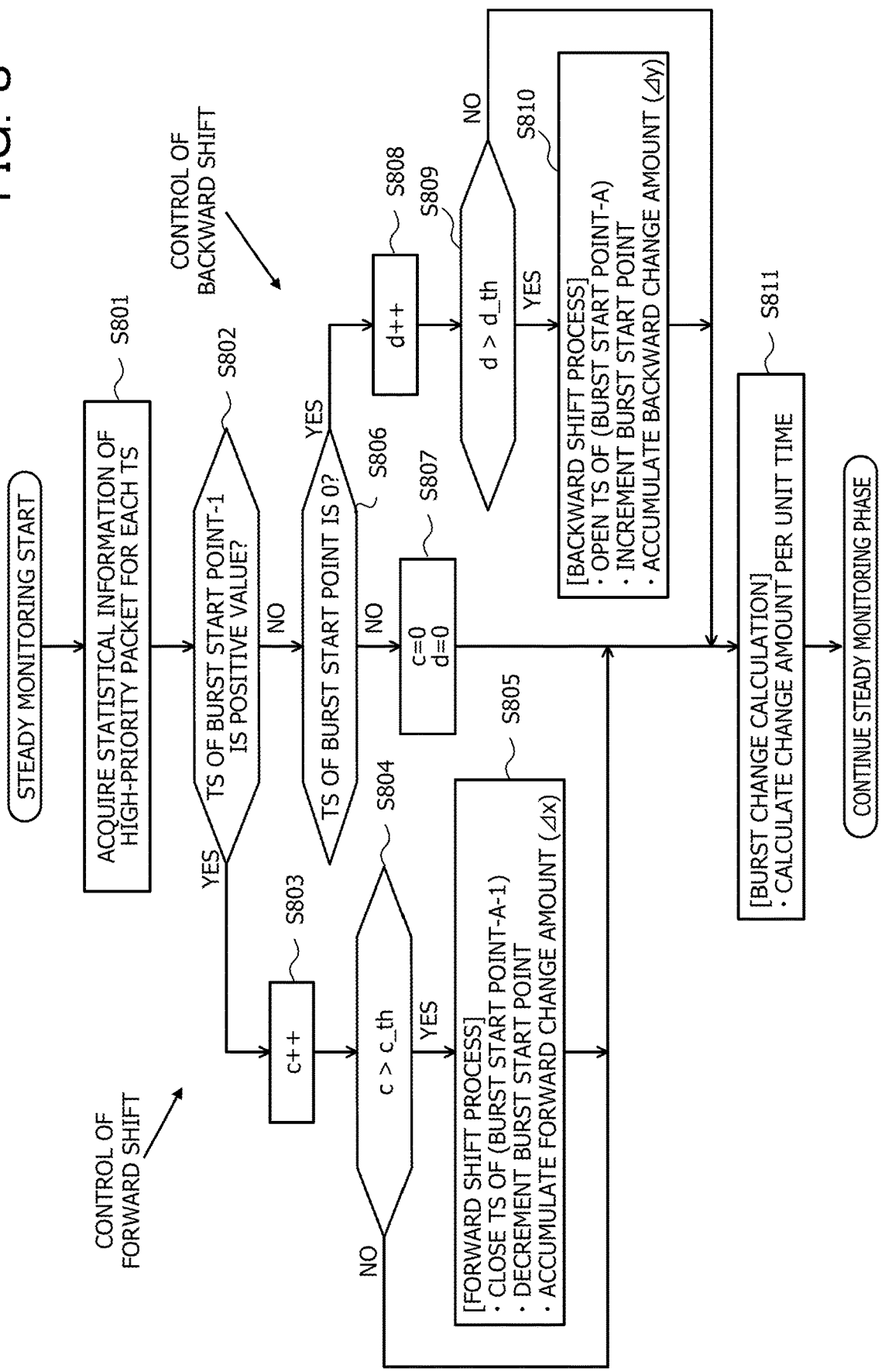
FIG. 8 is a flowchart illustrating an example of shift correction process of the burst start point in the steady monitoring phase of the packet switch.

FIG. 8 is a flowchart illustrating an example of shift correction process of the burst start point in the steady monitoring phase of the packet switch. The control unit 101 executes the following process as a shift correction process of the burst start point in the "steady monitoring phase" (3). First, the control unit 101 acquires statistical information of high-priority (MFH) packets for each TS (operation S801). The statistical information includes information of the MFH cycle determined in the "cycle determination phase" (1), the number of MFH packets corresponding to the burst cycle of the MFH burst created in the "close TS determination phase" (2), information of closing TSs, information of monitoring TSs, and the like.

Then, the control unit 101 executes the following process for each TS from the beginning of one MFH packet. First, it is determined whether or not the number of arrival packets of TS one before the burst start point Bs of the MFH packet is a positive value (operation S802). In the normal state, the number of arrival packets of TS located one before the burst start point Bs is 0. Therefore, when it is determined that the number of arrival packets is positive (Yes in operation S802), the control unit 101 determines that the forward shift occurs, and increments the number of forward shifts "c" by +1 (operation S803). Then, the control unit 101 determines whether or not the number of forward shifts "c" exceeds a predetermined threshold value c_th for forward shift determination (operation S804).

When it is determined that the number of forward shifts "c" exceeds the threshold value c_th for forward shift determination (Yes in operation S804), the forward shift process of the burst start point Bs is performed (operation S805). For example, the TS one before the burst start point Bs is closed, and the TS number of the burst start point Bs is decremented. At this time, the TS to close may be determined including a predetermined margin a with respect to the period of the TS. In addition, a forward change amount $\Delta x$ in this once process is accumulated and memorized. After that, the control unit 101 proceeds to a process of operation S811.

Meanwhile, when it is determined that the number of forward shifts "c" is less than the threshold value c_th of forward shift determination (No in operation S804), the control unit 101 proceeds to the process of operation S811.

Further, when it is determined that the number of arrival packets of TS one before the burst start point Bs of the MFH packet is not a positive value (No in operation S802), the control unit 101 determines whether or not the number of arrival packets of the burst start point Bs is 0 (operation S806). In the normal state, the number of arrival packets of TS located at the burst start point Bs is a positive value. Therefore, when it is determined that the number of arrival packets of the burst start point Bs is 0 (Yes in operation S806), it is determined that the backward shift occurs, and the number of backward shifts "d" is incremented by +1 (operation S808). Then, the control unit 101 determines whether or not the number of backward shifts "d" exceeds a predetermined backward shift threshold d_th pre-set (operation S809). Meanwhile, when it is determined that the number of arrival packets of the burst start point Bs is not 0 (No in operation S806), the control unit 101 resets the number of forward shifts "c" and the number of backward shifts "d" (operation S807) and proceeds to the process of operation S811.

Further, when it is determined that the number of backward shifts "d" exceeds the threshold value d_th of backward shift determination (Yes in operation S809), the backward shift process of the burst start point Bs is performed (operation S810). For example, the TS one before the burst start point Bs is opened, and the TS number of the burst start point Bs is incremented. At this time, the TS to open may be determined including a predetermined margin "a." In addition, a backward change amount $\Delta y$ in this once process is accumulated and memorized. After that, the control unit 101 proceeds to the process of operation S811.

Meanwhile, when it is determined that the number of backward shifts "d" is less than the threshold value d_th of backward shift determination (No in operation S809), the control unit 101 proceeds to the process of operation S811.

In operation S811, the control unit 101 calculates a burst change in MFH packet (operation S811). The result of the process of each of operation S805, operation S807, and operation S810 in the previous stage is a one-time shift correction process for one TS. In operation S811, the change amount of MFH packet per unit time is calculated based on the burst start point Bs, the burst end point Be, the forward change amount accumulation $\Delta x$ of operation S805, and the backward change amount accumulation $\Delta y$ of operation S810. Further, the length of one cycle set in the GCL 300 is adjusted based on the change amount of change of MFH packet per unit time. From the above, the process of the shift correction (correction of the closing TS of the GCL 300) for the burst start point Bs is completed. In the meantime, the steady monitoring phase continues.

FIG. 9 is a chart illustrating a gate opened/closed state due to the shift correction of the burst start point in the steady monitoring phase of the packet switch. FIG. 9 illustrates a "gate control" state (initial state) for non-MFH packets for each TS number (0, 1, 2, 3, . . . ), a "processing determination" state of forward shift of the MFH packet illustrated in FIG. 8, and a "gate control after correction (at the time of forward shift)" state based on the processing determination state.

In the initial state illustrated in FIG. 7A, the burst of MFH packets is located at TS3 to TS5 (the burst start point Bs is located at TS3). Correspondingly, in the "gate control" of FIG. 9, the gates of the non-MFH packets of TS3 to TS5 are set to be close.

Then, it is assumed that a forward shift corresponding to one TS illustrated in FIG. 7B occurred in the burst start point Bs located at TS3. In this case, as illustrated in the "processing determination" of FIG. 9, the control unit 101 changes the burst start point Bs1 of the close TS to TS2. Then, in the "gate control after correction," the setting of TS2 is changed from open to close.

Figure 10A:
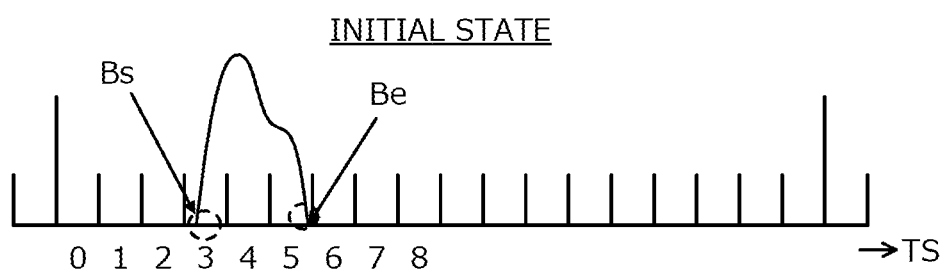
FIGS. 10A and 10B are each a diagram illustrating shift correction at the time of change in flow rate of a MFH packet, according to an existing technique.
Figure 10B:
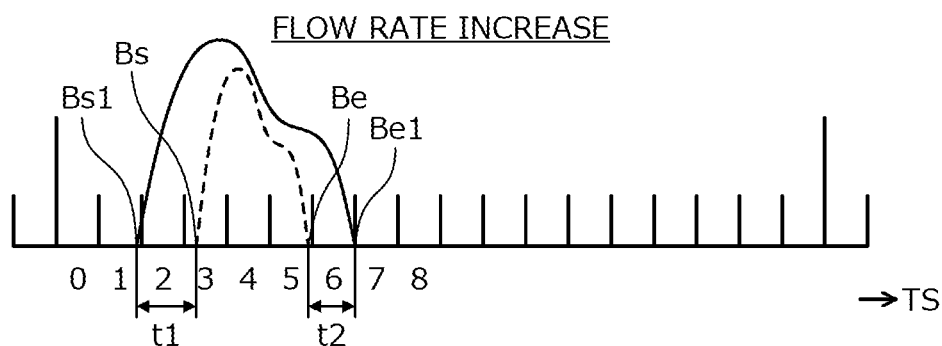

FIGS. 10A and 10B are each a diagram illustrating a shift correction at the time of change in the flow rate of an MFH packet, according to an existing technique. The initial state illustrated in FIG. 10A is the same as that in FIG. 7A, and it is assumed that the MFH packet has a burst length from TS3 to TS5. FIG. 10B illustrates a case where a large change (rapid increase in packet flow rate) occurs in the traffic pattern of MFH packet (burst length of MFH packet from TS2 to TS6).

In this way, when a rapid increase in packet flow rate occurs, the existing technique may only correct the shift for the burst start point Bs. In the above-described shift correction for the burst start point Bs (see FIG. 8), only a shift amount t1 for the burst start point Bs1 shifted from the burst start point Bs in the initial state can be corrected.

That is, in the existing technique, only when it is assumed that the MFH burst flow rate is constant, the shift correction of the burst end point Be is performed with the same shift amount as the shift amount of the burst start point Bs due to the clock deviation. Therefore, when a large change (rapid increase in packet flow rate) occurs in the traffic pattern of the packet arriving at the packet switch 100, the burst length changes accordingly. As a result, the shift amount of the burst end point Be may not be obtained and dealt with only from the burst start point Bs.

For example, as illustrated in FIG. 10B, when a rapid increase in packet flow rate occurs, a shift amount t2 for the burst end point Be1 shifted from the burst end point Be in the initial state may not be corrected. In FIG. 10B, the burst amount spreads back and forth with respect to the initial state of FIG. 10A, and while a forward shift (shift amount t1) occurs on the burst start point Bs side, a backward shift (shift amount t2) occurs on the burst end point Be side. In this way, the existing technique may not deal with the shift amount t2 occurring on the burst end point Be side only from the shift amount t1 occurring on the burst start point Bs side.

In this way, it is not possible to correct the shift of the burst end point Be only by the existing technique, that is, the shift detection of the burst start point Bs. In this case, after completing the steady monitoring phase (3) in the operating state, with the apparatus put into the non-operational state, the learning processes of the cycle determination phase (1) and the close TS determination phase (2) needs to be executed again. As a result, the start of the low-delay control is delayed, and the low-delay control itself may not be continued.

In the description of FIGS. 10A and 10B, the backward shift of the burst end point Be with the increase in packet flow rate has been described. The rapid change in packet flow rate appears as an unspecified change in burst length. Therefore, even when a forward shift occurs in the burst end point Be due to a rapid decrease in packet flow rate, since the burst length changes, so that the shift correction of the burst end point Be based only on the burst start point Bs cannot be performed correctly.

[Shift Correction of Burst End Point in Steady Monitoring Phase]

Figure 11A:
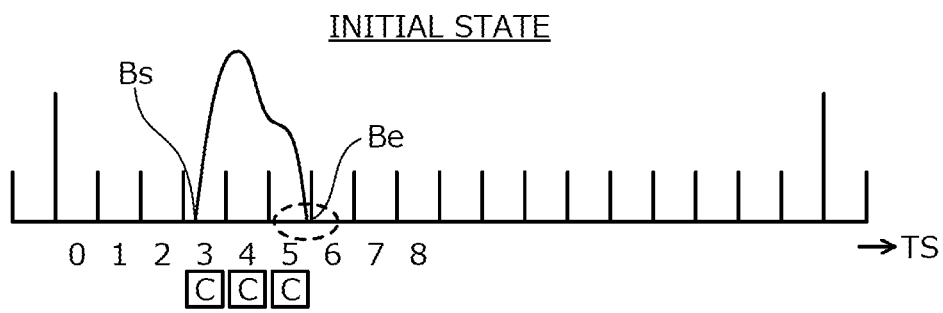
FIGS. 11A, 11B and 11C are each an explanatory diagram of an example of shift correction process of the burst end point in the steady monitoring phase of the packet switch.
Figure 11B:
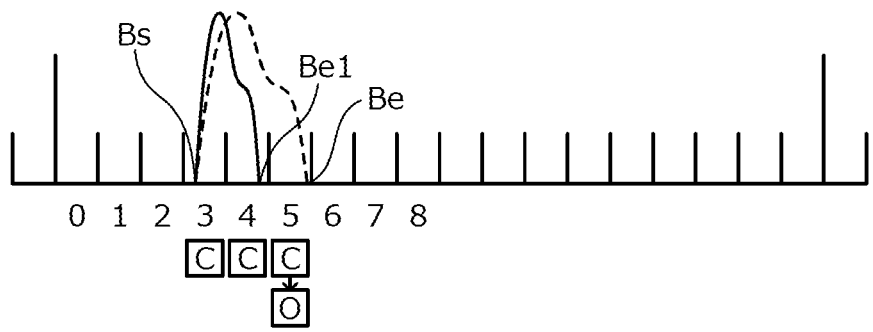
Figure 11C:
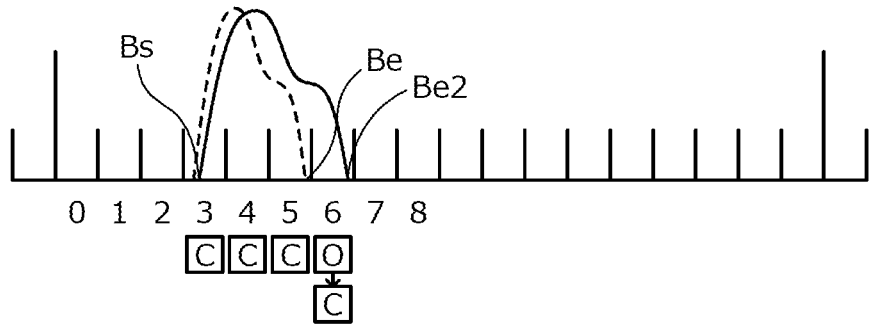

FIGS. 11A to 11C are each an explanatory diagram of an example of shift correction process of the burst end point in the steady monitoring phase of the packet switch. In the initial state illustrated in FIG. 11A, the control unit (CPU) 101 monitors the burst end point Be of MFH in addition to the monitoring of the burst start point Bs described above. The burst end point Be is located at TS5. In this case, the packet switch 100 performs control of close where TS3 to TS5, which correspond to the burst period of MFH, do not pass non-priority packets.

FIGS. 11B and 11C illustrate a case where a large change occurs in the traffic pattern of the packet arriving at the packet switch 100. FIG. 11B illustrates a state where the packet flow rate rapidly decreases, a forward shift occurs in the burst end point Be, and the shifted burst end point Be1 is located at TS4. In this case, the control unit 101 changes TS5 that has been closed until then, to open.

Further, in FIG. 11C, it is assumed that the packet flow rate rapidly increases, a backward shift occurs in the burst end point Be, and the shifted burst end point Bet is located at TS6. In this case, the control unit 101 changes TS6 that has been opened until then, to close.

Such close and open of each TS is performed for non-MFH packets. For example, in the example of FIG. 11B, TS5 that has closed the non-MFH packet passage in FIG. 11A in the initial state is changed to open.

In the example of FIG. 11C, TS6 that has passed (opened) the non-MFH packets in FIG. 11A in the initial state is changed to close.

Figure 12:
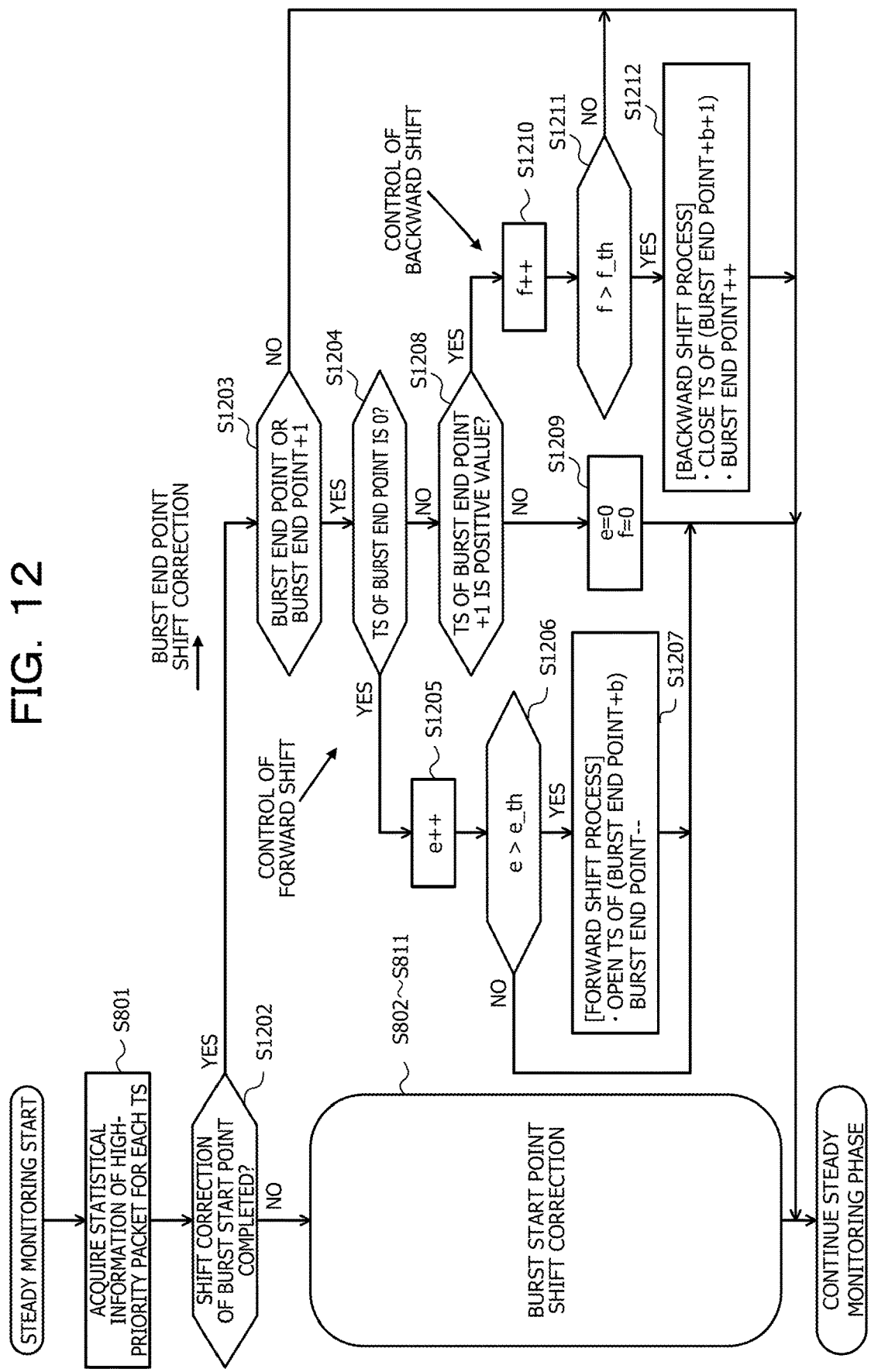
FIG. 12 is a flowchart illustrating an example of shift correction process of the burst end point in the steady monitoring phase of the packet switch.

FIG. 12 is a flowchart illustrating an example of shift correction process of the burst end point in the steady monitoring phase of the packet switch. The control unit 101 executes the following process as a shift correction process of the burst end point in the "steady monitoring phase" (3). As illustrated in FIG. 12, the shift correction process of the burst end point is used in combination with the shift correction process at the burst start point described above. In FIG. 12, the same operations as those in the shift correction process of the burst start point illustrated in FIG. 8 will be denoted by the same operation numbers.

First, the control unit 101 acquires statistical information of the high-priority (MFH) packet for each TS (operation S801). This statistical information includes information of the MFH cycle determined in the "cycle determination phase" (1), the number of MFH packets corresponding to the burst period of the MFH burst created in the "close TS determination phase" (2), information of closing TSs, information of monitoring TSs, and the like.

Then, the control unit 101 determines whether or not the shift correction process for the burst start point Bs has been completed (operation S1202). For example, when it is determined that the shift correction process for the burst start point Bs is not completed (No in operation S1202), the control unit 101 executes the shift correction process for the burst start point Bs (operations S802 to S811 in FIG. 8).

Meanwhile, when it is determined that the shift correction process (FIG. 8) for the burst start point Bs is completed (Yes in operation S1202), the shift correction process (monitoring) for the burst end point Be after operation S1203 is started.

First, it is determined whether or not a TS is TS of the burst end point Be of the MFH packet or TS one after the burst end point Be (operation S1203). When it is determined that the TS is TS of the burst end point Be of the MFH packet or TS one after the burst end point Be (Yes in operation S1203), the control unit 101 determines whether or not the number of arrival packets of the TS of the burst end point Be is 0 (operation S1204). Meanwhile, when it is determined that the TS is neither TS of the burst end point Be of the MFH packet nor TS one after the burst end point Be (No in operation S1203), the control unit 101 ends the shift correction process of the burst end point Be described above.

Then, when it is determined that the number of arriving packets is 0 (Yes in operation S1204), the control unit 101 determines that a forward shift occurs, and increments the number of forward shifts "e" by +1 (operation S1205). Then, the control unit 101 determines whether or not the number of forward shifts "e" exceeds a predetermined threshold value e_th for forward shift determination (operation S1206).

When it is determined that the number of forward shifts "e" exceeds the threshold value e_th for forward shift determination (Yes in operation S1206), the forward shift process of the burst end point Be is performed (operation S1207). For example, TS of the burst end point Be is opened, and a TS number of the burst end point Be is decremented. At this time, the TS to open may be determined including a predetermined margin "b." Then, the shift correction process of the burst end point is ended. Meanwhile, when it is determined that the number of forward shifts "e" is less than the threshold value e_th for forward shift determination (No in operation S1206), the control unit 101 ends the shift correction process of the burst end point.

Meanwhile, when it is determined that the number of arrival packets is other than 0 (No in operation S1204), the control unit 101 determines whether or not the number of arrival packets of the next TS of the burst end point Be is a positive value (operation S1208). When it is determined that the number of arrival packets of the TS of the burst end point Be+1 is a positive value (Yes in operation S1208), it is determined that a backward shift occurs, and the number of backward shifts "f" is incremented by +1 (operation S1210). Then, the control unit 101 determines whether or not the number of backward shifts "f" exceeds a predetermined backward shift threshold value f_th (operation S1211). Meanwhile, when it is determined that the number of arrival packets of the TS of the burst end point Be+1 is not a positive value (No in operation S1208), the control unit 101 resets the number of forward shifts "e" and the number of backward shifts "f" (operation S1209) and ends the shift correction process of the burst end point.

Further, when it is determined that the number of backward shifts "f" exceeds the threshold value f_th for backward shift determination (Yes in operation S1211), the backward shift process of the burst end point Be is performed (operation S1212). For example, TS one after the burst end point Be is closed, and a TS number of the burst end point Be is incremented. At this time, the TS to close may be determined including a predetermined margin "b."

After the process of operation S1212, when it is determined that the number of backward shifts "f" does not exceed the threshold value f_th of backward shift determination (No in operation S1211), the control unit 101 ends the shift correction process of the burst end point. From the above, the shift correction process for the burst end point Be is ended (the steady monitoring phase continues).

FIG. 13 is a chart illustrating a gate opened/closed state due to the shift correction of the burst end point in the steady monitoring phase of the packet switch. FIG. 13 illustrates a state of shift correction of the burst end point after the shift correction of the burst start point illustrated in FIG. 9.

In the initial state illustrated in FIG. 11A, the burst of the MFH packet is located at TS3 to TS5 (the burst end point Be is located at TS5). Correspondingly, in the "gate control" of FIG. 13, the gates of non-MFH packets of TS3 to TS5 are set to be close.

Then, it is assumed that a backward shift corresponding to one TS illustrated in FIG. 11C occurred in the burst end point Be located at TS5. In this case, as illustrated in the "processing determination" of FIG. 13, the control unit 101 changes the burst end point Be of the close TS to TS6. Then, in the "gate control after correction," the setting of TS6 is changed from open to close.

Figure 14A:
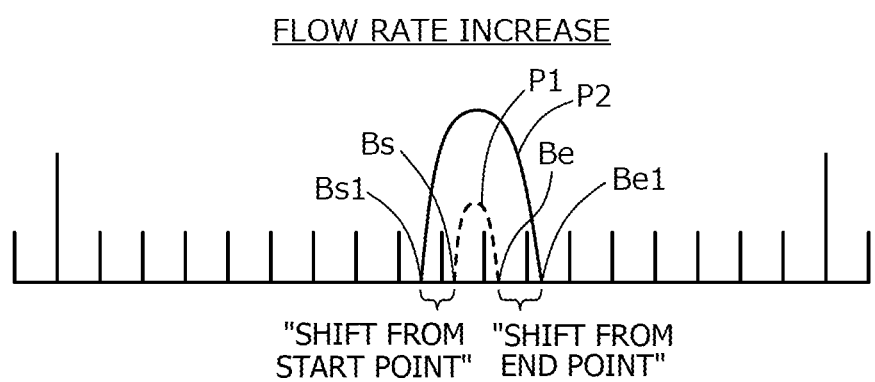
FIG. 14A is a diagram illustrating a shift correction state when the packet flow rate rapidly changes in the steady monitoring phase of the packet switch.

FIG. 14A is a diagram illustrating a shift correction state when the packet flow rate rapidly changes in the steady monitoring phase of the packet switch. According to an embodiment, it is assumed that a MFH packet has a predetermined packet flow rate P1, a burst start point Bs, and a burst end point Be in the initial state. Then, when the packet flow rate P2 rapidly changes (increases in the illustrated example), the burst length with respect to TS (time direction) changes, a forward shift Bs1 occurs at the burst start point Bs, and a backward shift Be1 occurs at the burst end point Be.

According to an embodiment, the control unit 101 independently performs the shift correction of the burst end point Be, in addition to the shift correction of the burst start point Bs. As a result, even when the packet flow rate rapidly changes with respect to the state (initial state) of the GCL 300 created by learning, it is possible to perform the shift correction between the burst start point Bs and the burst end point Be within the process in the steady monitoring phase. That is, it is possible to correct the forward shift of the burst start point Bs, and also correct the forward shift or backward shift of the burst end point Be. Further, it is possible to correct the backward shift of the burst start point Bs and also correct the forward shift or backward shift of the burst end point Be.

Figure 14B:
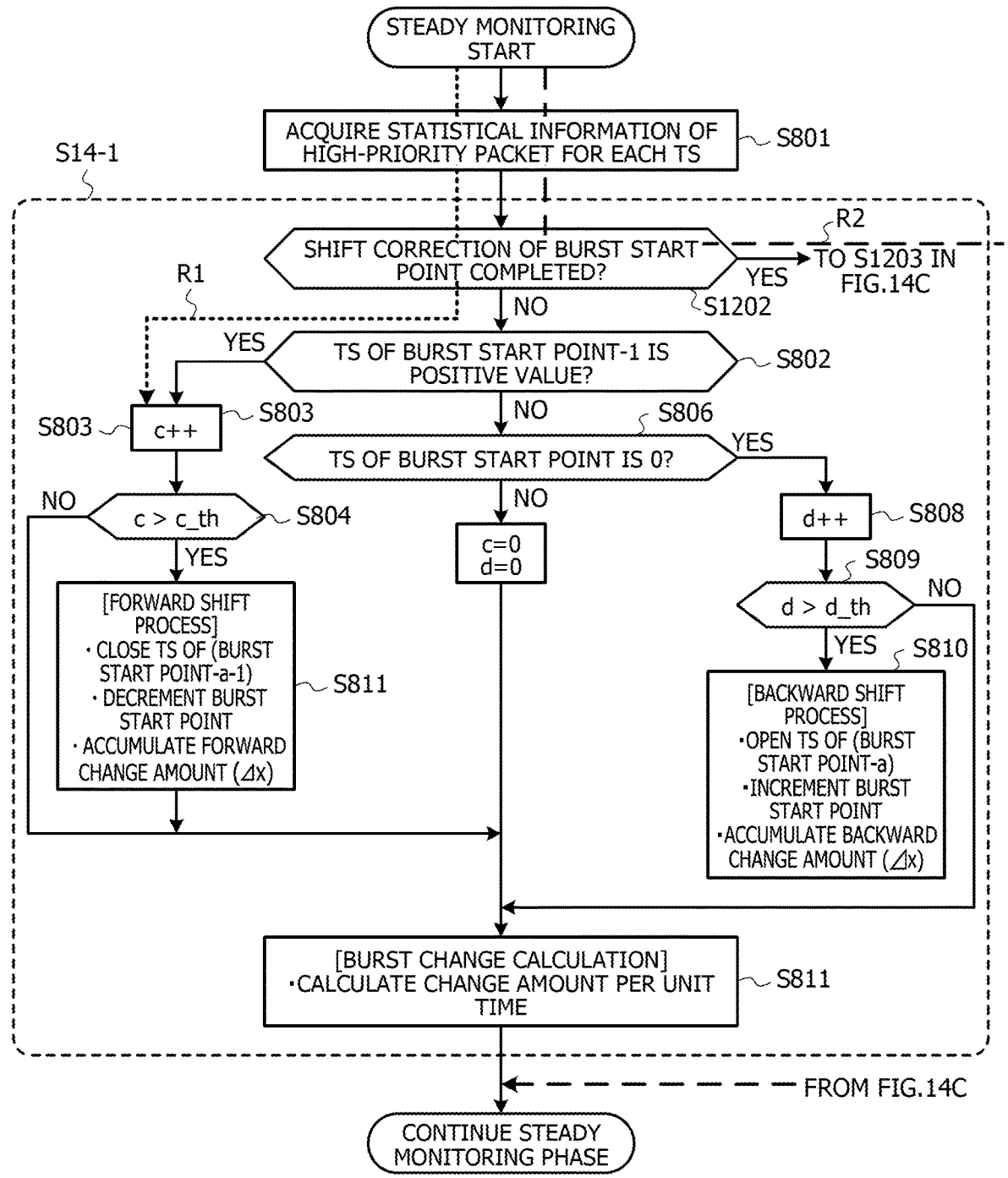
FIGS. 14B and 14C are flowcharts illustrating the overall shift correction process in the steady monitoring phase of the packet switch.
Figure 14C:
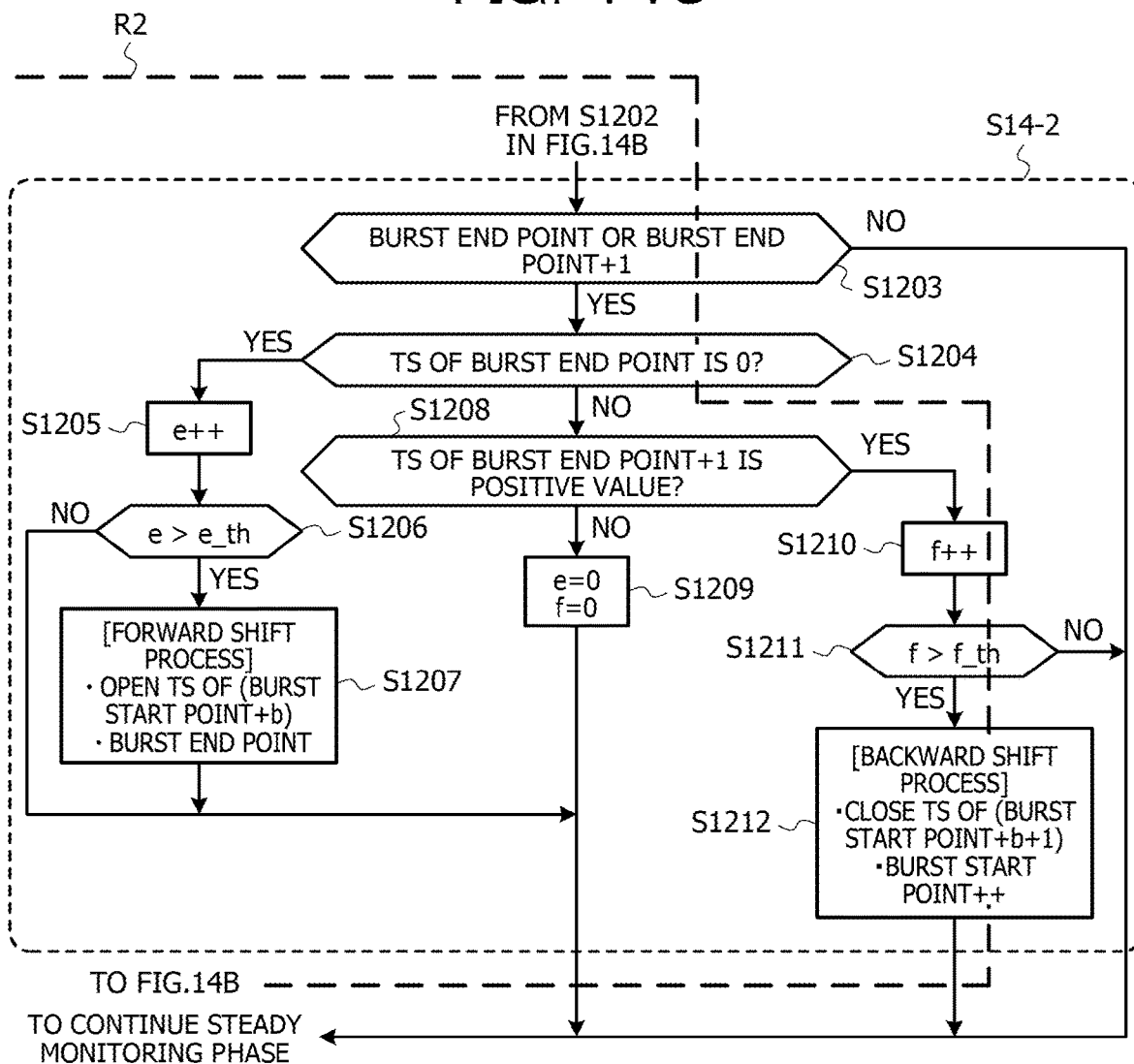

FIG. 14B is a flowchart illustrating the overall shift correction process in the steady monitoring phase of the packet switch. FIG. 14B illustrates the shift correction process of the burst start point Bs (S14-1, corresponding to FIG. 8) and the shift correction process of the burst end point Be (S14-2, corresponding to FIG. 12) together.

For example, as illustrated in FIG. 14A, it is assumed that a forward shift Bs1 occurs at the burst start point Bs and a backward shift Be1 occurs at the burst end point Be. In this case, the control unit 101 performs the correction process of the forward shift Bs1 of the burst start point Bs according to a procedure indicated by R1 in the shift correction process (S14-1) of the burst start point Bs. Then, the control unit 101 performs the correction process of the backward shift Be1 of the burst end point Be according to a procedure indicated by R2 in the shift correction process (S14-2) of the burst end point Be.

The packet switch 100 described above learns the arrival pattern of high-priority packets having the cyclicity and determines a time slot to close the transmission of non-priority packets based on the learning result. At this time, the packet switch 100 monitors the burst end point of the high-priority packets, and determines a time slot to close based on the time slot shift of the burst end point when the traffic changes after the learning. When the traffic flow rate of the high-priority packet increases, a backward shift occurs at the burst end point of the high-priority packet, and when the traffic flow rate of the high-priority packet decreases, a forward shift occurs at the burst end point of the high-priority packet. Then, by monitoring the burst end point, the time slot to close the transmission of the non-priority packet may be appropriately determined based on the burst end point of the high-priority packet detected at each time when the traffic flow rate of the high-priority packet increases and decreases.

Further, when it is determined that the burst end point is a forward shift of the time slot, the packet switch 100 changes the time slot after the burst end point corresponding to the forward shift amount from close to open. This makes it possible to easily determine the time slot to open the transmission of non-priority packets by correcting the learning result even when the traffic flow rate of high-priority packets decreases rapidly.

Further, when it is determined that the burst end point is a backward shift of the time slot, the packet switch 100 changes the time slot of the burst end point corresponding to the backward shift amount from open to close. This makes it possible to easily determine the time slot to close the transmission of non-priority packets by correcting the learning result even when the traffic flow rate of high-priority packets increases rapidly.

Further, the packet switch 100 performs the learning by the cycle determination phase for determining the cyclicity of the high-priority packet in the non-operating state of the apparatus and the close TS determination phase for determining the time slot to close based on the determined cyclicity. It also includes the steady monitoring phase to monitor arriving packets based on the learning result in the operating state of the apparatus. Then, the packet switch 100 determines the time slot to close in the steady monitoring phase. As a result, the packet switch 100 may easily control the presence/absence of transmission for non-priority packets by correcting the learning result when the shift of the burst end point is detected in the steady monitoring phase after the learning. As a result, even when the traffic flow rate of the high-priority packet rapidly increases or decreases, it is possible to determine the time slot to close the transmission of the non-priority packet while continuing the operating state of the packet switch 100. Then, the packet switch 100 may appropriately control the transmission of high-priority packets and non-priority packets by autonomous learning, thereby improving the performance for packet transmission.

Further, the high-priority packet may be applied to, for example, a MFH (Mobile Front Hall) packet in 5G. The packet switch 100 learns the arrival pattern of the MFH packet and close-controls the transmission of the non-MFH packet. Then, even when the traffic flow rate of the MFH packet rapidly increases or decreases, it is possible to easily and quickly control the presence/absence of transmission for the non-MFH packet by correcting the learning result by detection of the shift of the burst end point. Then, the low-delayability needed by the MFH packet may be maintained.

Further, in addition to the process of determining the time slot to close in response to the shift of the time slot of the burst end point by monitoring the burst end point of the high-priority packet as described above, the packet switch 100 may perform the same process for the shift at the burst start point. This makes it possible to perform the shift correction for the entire burst of high-priority packets. The shift at the burst start point is caused by the clock deviation, and the shift at the burst end point is caused by a rapid change in traffic flow rate of the MFH packet. In response to these different factors, the transmission of non-MFH packets may be appropriately closed and the low-delayability of MFH packets can be maintained.

The time slot setting method described in the present embodiment may be implemented by a computer such as a CPU executing a program prepared in advance. The time slot setting program described in the present embodiment is executed by being recorded on a readable recording medium and being read from the recording medium by a computer. Further, the time slot setting program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet switch comprising:
   a memory; and
   a processor coupled to the memory and configured to:
   learn a pattern of a high-priority packet having a cyclicity;
   monitor a burst end point of the high-priority packet, based on a result of the learning;
   detect a shift of a time slot of the burst end point when a traffic flow rate of the high-priority packet changes; and
   determine the time slot to close transmission of a non-priority packet, based on the shift of the time slot.

2. The packet switch according to claim 1, wherein
   when determined that the burst end point has a forward shift of the time slot,
   the processor is configured to change, from close to open, the time slot after the burst end point, the time slot corresponding to the amount of the forward shift.

3. The packet switch according to claim 1, wherein
   when determined that the burst end point has a backward shift of the time slot,
   the processor is configured to change, from open to close, the time slot before the burst end point, the time slot corresponding to the amount of the backward shift.

4. The packet switch according to claim 1, wherein the processor is configured to:
   learn in a first phase for determining the cyclicity of the high-priority packet and a second phase for determining the time slot to close based on the determined cyclicity, and
   determine the time slot to close in a third phase for monitoring a packet, based on a result of the learning in the first phase and the second phase.

5. The packet switch according to claim 1, wherein the processor is further configured to:
   monitor a burst start point of the high-priority packet; and
   determine the time slot to close, based on the shift of the time slot of the burst start point.

6. The packet switch according to claim 1, wherein the high-priority packet is a Mobile Front Hall (MFH) packet.

7. A method of setting a time slot, the method causing a computer to execute a process, the process comprising:
   learning a pattern of a high-priority packet having a cyclicity;
   monitoring a burst end point of the high-priority packet, based on a result of the learning;
   detecting a shift of the time slot of the burst end point when a traffic flow rate of the high-priority packet changes; and
   determining the time slot to close transmission of a non-priority packet, based on the shift of the time slot.

8. The method according to claim 7, wherein the process is further comprising:
   monitoring a burst start point of the high-priority packet; and
   determining the time slot to close, based on the shift of the time slot of the burst start point.

* * * * *